United States Patent

[11] 3,608,681

| [72] | Inventor | Karl Schlor<br>Biebesheim (Rhine), Germany |
|---|---|---|
| [21] | Appl. No. | 826,037 |
| [22] | Filed | Feb. 24, 1969 |
| [45] | Patented | Sept. 28, 1971 |
| [73] | Assignee | Alfred Teves GmbH<br>Frankfurt am Main, Germany |
| [32] | Priority | Feb. 23, 1968 |
| [33] | | Germany |
| [31] | | P 16 55 479.3 |

[54] HYDRODYNAMIC BRAKE
4 Claims, 3 Drawing Figs.

[52] U.S. Cl. .................................................. 188/274,
188/264 R, 188/290, 188/296, 192/4 A
[51] Int. Cl. .................................................. F16d 57/06
[50] Field of Search .......................................... 188/90, 90
A, 264 R, 264 E, 290, 296, 274; 192/4 A

[56] References Cited
UNITED STATES PATENTS

| 2,341,122 | 2/1944 | Schmidt ...................... | 188/90 A |
|---|---|---|---|
| 2,496,497 | 2/1950 | Russell ........................ | 188/90 A |
| 3,185,261 | 5/1965 | Campbell et al............. | 188/90 A |

FOREIGN PATENTS

| 1,132,244 | 10/1956 | France ......................... | 188/264 |
|---|---|---|---|
| 1,213,268 | 3/1966 | Germany...................... | 188/264 |
| 466,436 | 5/1937 | Great Britain................ | 188/90 A |
| 484,040 | 8/1953 | Italy ............................. | 188/90 A |

*Primary Examiner*—George E. A. Halvosa
*Attorney*—Karl F. Ross

ABSTRACT: A hydrodynamic brake received in the axle housing of a vehicle with independently operable rotors connected to the wheels on opposite sides of the vehicle. Within the wheel assemblies, there are provided step-up transmissions connecting the wheels to the rotor shafts. The axle housing includes a compartment for storage of the brake fluid while the thermal energy of the brake fluid is dissipated through the wall of the housing.

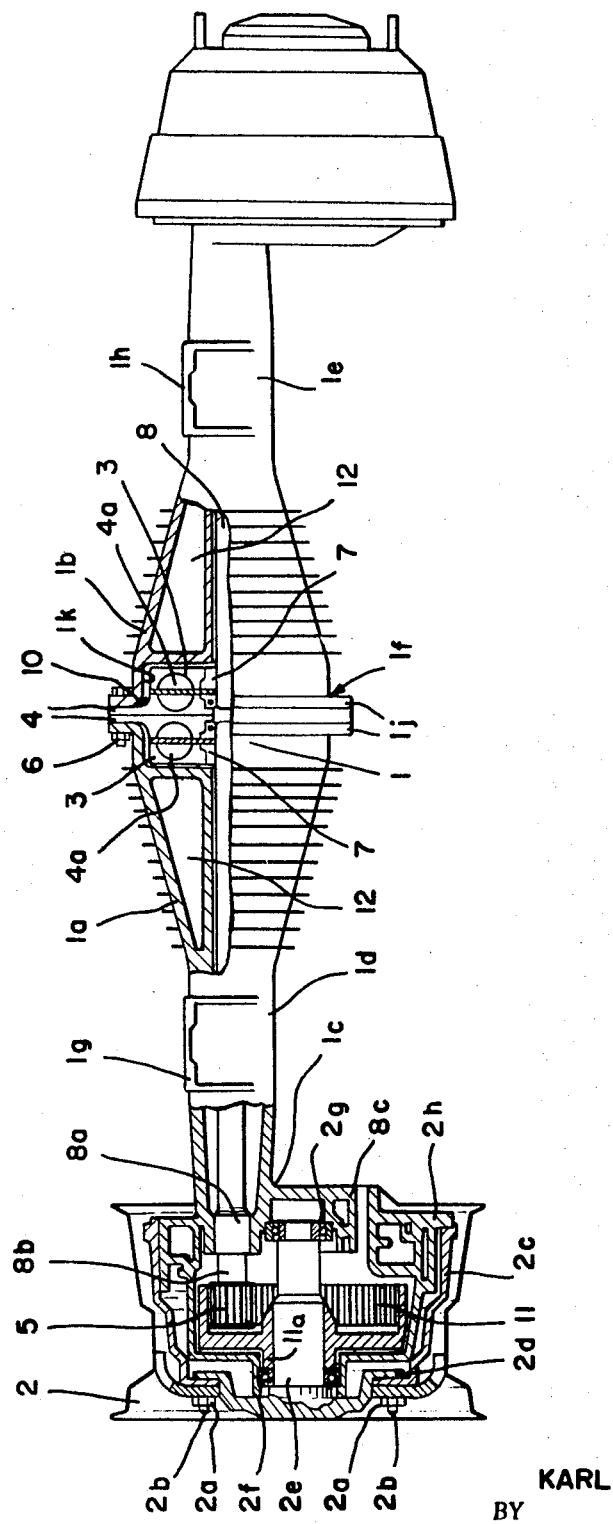
FIG. I
INVENTOR.
KARL SCHLÖR
BY
Karl F. Ross
ATTORNEY

INVENTOR.
KARL SCHLÖR
BY Karl F. Ross
ATTORNEY

HYDRODYNAMIC BRAKE

My present invention relates to a hydrodynamic brake system and, more particularly, to a hydrodynamic brake arrangement for a heavy-duty vehicle in which kinetic energy of vehicle motion is transformed into heat and dissipated from the system.

It has already been proposed to provide hydrodynamic brakes or decelerators in the driving train of an automotive vehicle, i.e. between the engine and the driven wheels, to act as an auxiliary braking device in conjunction with the usual wheel brakes. In such systems, a rotary pumping member, i.e. a rotor connected with the axis shaft of the vehicle, displaces a hydraulic fluid along a closed path including a heat-dissipating station in the form of a heat exchanger which dissipates the heat of the fluid produced by conversion of the kinetic energy of rotation of this shaft into thermal energy of the fluid. The resulting deceleration of the shaft is proportional to the amount of heat generated in the fluid. Such brakes are often termed "kinetic brakes."

In the commonly assigned U.S. Pat. Nos. 13,265,162, 3,302,665 and in the commonly assigned copending application Ser. No. 688,139 filed Dec. 5 1967 (now U.S. Pat. No. 3,451,511) and the prior application Ser. No. 672,121 of Oct. 2 1967 (now U.S. Pat. No. 3,489,252), the principle of operation and some advantageous constructions of hydrodynamic or kinetic decelerators of the aforementioned type are described and claimed. As noted there, a hydrodynamic brake is most effective at high vehicle speeds and thus may be brought into play prior to the mechanical wheel brakes of the vehicle to effect an initial slowdown at speeds at which the mechanical or friction brakes are rapidly worn out and are of little effectiveness. The device may also be used to hold vehicle speed constant. However, at low vehicle speeds, the pumping efficiency falls off and the hydrodynamic decelerator plays a less significant role in the braking process. In fact, hydrodynamic decelerators alone are frequently incapable of bringing the vehicle to a standstill. Thus it has been suggested in these applications and elsewhere to provide additional friction brakes in the decelerator housing and to use a differential valve responsive to the braking effectiveness of the hydraulic decelerator to bring the friction brakes at the wheels or decelerator housing into play. For the most part, a hydraulic decelerator of the character described is located between the differential, which distributes its power to the driven wheels of the vehicle and the drive shaft which is connected with the transmission while the stator of the decelerator is connected with the housing.

In application Ser. No. 688,139, it is pointed out that an increase in the efficiency of the decelerator can be obtained when instead of a single rotor, the friction in the fluid is developed by a pair of counterrotating rotors driven in opposite senses and cooperating to increase the interaction of the rotor vanes with the liquid beyond the interaction available with a single rotor device. In that system, the rotors are coaxial with one another and have interfittable arrays of vanes, preferably extending axially toward one another, each of these arrays being made up of angularly equispaced vanes. The arrays are radially offset from one another with respect to the axis of the device. This arrangement, in which counterrotating interfitting arrays of vanes form the pump assembly, permits hydrodynamic braking to a high degree with a much more compact configuration of the assembly. In addition, the compact construction allows a basic characteristic of earlier systems, namely, the provision of a heat exchanger remote from the pumping system to be eliminated. Thus this assembly permits the heat-dissipating means to be formed integrally with the pump unit and will be constituted by a heat-conductive housing around the rotor. This housing defines with the rotor a heat-exchange chamber through which a coolant is induced to flow in heat-receiving relationship with the liquid circulated by the pumping rotors. A blower, advantageously driven by the rotating shaft structure, induces the flow of the coolant, preferably air, through the cooling jacket or heat exchanger.

It is the principal object of the present invention to provide a hydraulic decelerator system operating along the principles originally set forth in the aforementioned applications and letters patent, but of improved structural configuration, efficiency and reduced cost.

Still another object of this invention is to provide a compact hydraulic decelerator which need not be used in conjunction with a separate heat-exchanger unit.

Still another object of this invention is to provide a kinetic brake or hydrodynamic decelerator which eliminates the need for the circulation between a heat exchanger and the pumping unit of the decelerator of a secondary fluid designed to dissipate the heat generated upon conversion of the kinetic energy of vehicle movement into thermal energy of a primary fluid.

In the aforedescribed and earlier hydrodynamic brake arrangements, it is commonplace to provide the hydrodynamic brake along the drive train at various locations between the engine and the driven wheels. For example, some systems provide the hydrodynamic brake between the engine and the transmission, while others connect the unit between the transmission and the power shaft which is connected thereto and to the differential of the driven wheels by the universal or cardan joints or couples.

Still other arrangements provide the hydrodynamic brake as part of the power shaft (between the universal joints) and between the power shaft and the differential or on the differential itself.

In all of these arrangements, the hydrodynamic brake action affects both wheels on opposite sides of the vehicle identically. This has proved to create difficulties since the wheels may not run at the same angular velocity or experience the same loading. For example, the load surfaces encountered by the wheels may differ or one more wheel may have to travel faster than the other as the vehicle negotiates a curve. Also, one wheel may be mechanically braked to a greater extent when the other as a result of the braking characteristics and one wheel may slip more than the other in dependence upon the tire and road surface frictions. Hence it is not always desirable to have the hydrodynamic brake act identically on the wheels on opposite sides of the vehicle. Moreover, special power shaft and housing arrangements may be necessary to allow mounting of the hydrodynamic brake or its enclosure. These arrangements increase the vehicle weight, occupy space that may be required for other purposes, reduce the clearance between the ground surface and the undercarriage of the vehicle and increase vehicle cost.

It is, therefore, another important object of the present invention to provide an improved hydrodynamic brake arrangement for the deceleration of a vehicle or maintenance of constant vehicle speed which will obviate the aforedescribed disadvantages.

Another object of my invention is the provision of a hydrodynamic brake for an automotive vehicle which is coupled to wheels on opposite sides thereof and is effective in spite of independent rotation of these wheels.

Still another object of my invention is the provision of an improved hydrodynamic brake for heavy-duty automotive vehicle, especially trucks of trailer-type and the trailers thereof.

I have now found that it is possible to attain these objects and others which will be apparent hereinafter by providing a hydrodynamic brake in an axle housing to which wheels on opposite sides of the vehicle are journaled, the hydrodynamic brake having at least two rotatable members, preferably rotors operating in the same sense and driven with respect to the stator assembly connected to the housing so as to be nonrotatable relatively thereto, the rotors being driven from the wheels to which they are connected. The wheels may be the wheels of a trailer which are rotated by friction and are preferably connected to the shafts of these rotors by step-up transmissions built into the wheel assemblies and at least partly enclosed by the tire-carrying wheel disks. The shafts of the rotor are journaled in the axle housing and may extend perpendicularly to the longitudinal vertical plane of symmetry through the axle housing. The hydrodynamic brake constituted as thus described acts as a differential in the sense that rotation of the rotors at different rates is permitted with corresponding differences in the rotation of the wheels. However, the usual gear differential may also be provided in the axle housing or thereon. Furthermore, the brake may occupy axle housings which might otherwise be used for differentials and thus requires no additional structure for enclosing the brake.

According to a further feature of this invention, the hydrodynamic brake is constituted as a Foettinger-type torque converter or fluid coupling in which a single stator, provided with vanes on its opposite surfaces, is confronted by a pair of complementarily vaned rotors. Each rotor is, of course, connected with the respective wheel by a gear transmission. Furthermore, all of the control and other systems associated with the hydrodynamic brake may also be built into the axle housing. For example, a secondary coolant circuit, into which the heat of the brake fluid is dissipated, may include the air passing over the axle housing which may be enclosed in an air-cooling jacket for this purpose. In this case, I prefer to provide the housing with ribs or the like for increasing the surface area of the housing exposed to air and thereby increasing heat exchange therewith. The housing may be enclosed in a jacket having an axial outlet opening, the jacket fitting over the arms of the axle with clearance to form inlets. The blower may be provided to induce the flow of air through the jacket as described in the last-mentioned patent application.

According to still another feature of this invention, the housing itself is compartmented or double-walled to define a space adapted to receive the hydrodynamic brake fluid for storage or heat dissipation.

The above and other objects, features and advantages of the present invention will become more readily apparent from the following description, reference being made to the accompanying drawing in which:

Fig. 1 is an axial cross-sectional view, taken partly along a vertical plane, illustrating a hydrodynamic brake according to the present invention;

Figure 3:
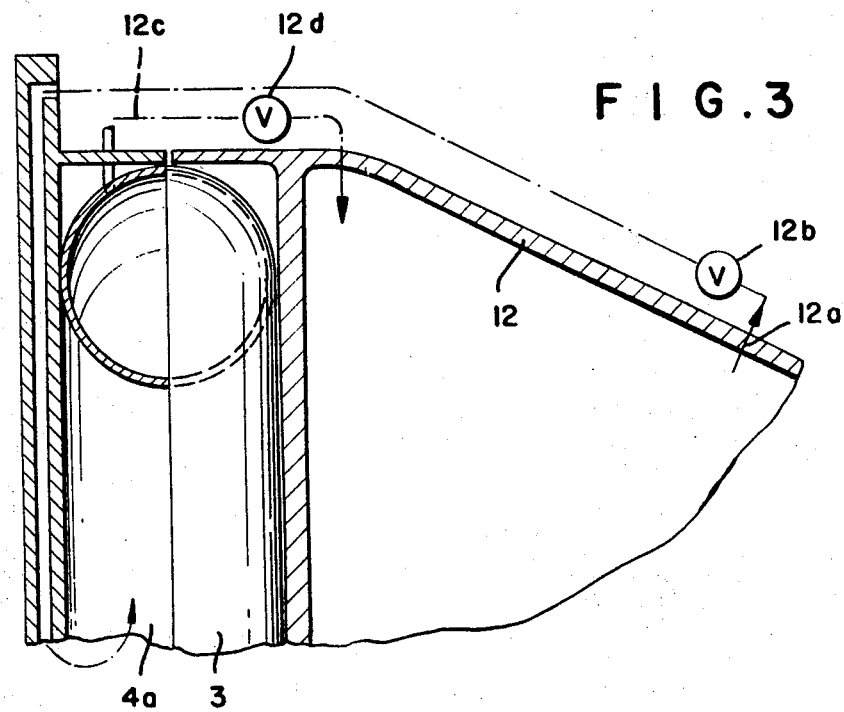
Figure 2:
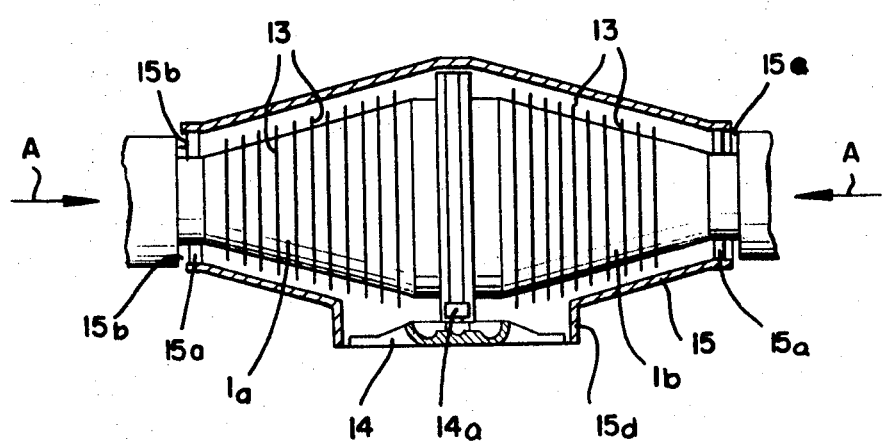
FIG. 2 is a view of the brake provided with a coolant jacket.

FIG. 3. is a diagram of an arrangement for controlling the hydrodynamic brake of FIGS. 1 and 2. In FIGS. 1 and 2 of the drawing, I show two wheel assemblies for the wheels of a heavy-duty trailer adapted to be towed or drawn by a road tractor. The wheel disk 2 (FIG. 1) is adapted to carry the tire and is held by nuts 2a on the bolts 2b of the wheel assembly. The wheel assembly comprises a housing structure 2c held in place by the nuts 2a which extend through an inwardly turned flange from the outwardly turned flange 2d of the wheel shaft 2e. The latter is journaled in a pair of bearings 2f and 2g of the housing 2c into which extends the end 1c of the corresponding arm 1d or 1e of the axle housing 1.

The axle housing is supported on the underside of the tractor and has an enlarged central portion 1f the construction of which will be described in greater detail hereinafter. A shaft 8 extends axially through each arm 1d and 1e of the axlehousing, which can be supported by bolts through the pedestals 1g and 1h engaging springs of a leaf-spring suspension in the conventional manner.

The shafts 8 are journaled at 8a at the free ends of the arms 1d and 1e and have stubs 8bb which extend into the stationary wheel housing portion 2h and the axle support portion 8c carrying the bearings 2f and 2g respectively.

A spur gear or pinion 5 on the stub 8b meshes with the internal ring gear 11 whose hub 11a is keyed to the shaft 2e so that a step-up speed-increasing transmission is constituted by the members 5, 11. As each wheel rotates in frictional engagement with the ground surface, the shaft 8 is driven at a related speed with a transmission ratio determined by the gear ratio of members 5 and 11.

In the enlarged central portion of the housing 1, which is held together by bolts 6 at the flanges 1j, a chamber 1k is formed to receive a hydrodynamic brake assembly. This assembly comprises a double stator 4 consisting of two stators in back-to-back relationship whose vanes or blades 4a face in opposite directions outwardly and which is clamped between the axle housing sections 1a and 1b. A pair of rotors 3 are provided with the usual vanes and flank the stator 4 and are connected by coupling 7 with the respective shaft 8 so as to be rotatable independently from one another. A clearance 10 is formed around these hydrodynamic brake members which constitute a Foettinger torque converter structure which circulates hydrodynamic brake fluid through respective compartments 12 of a conical configuration surrounding the shafts 8. Suitable rotor and stator structures are shown at page 272–278 of Principles of Automotive Vehicles, U.S. Government Printing Office, Washington D.C., 1956.

In operation, the hydrodynamic brake may be activated to admit fluid from the chamber 12 into the compartments formed between the rotor and the stator and thus allow the rotor to pump the fluid along a closed path back into the chamber 12 from which the kinetic heat of the fluid is dissipated through the wall of the housing portions 1a and 1b via annular cooling ribs 13 into the atmosphere. As the kinetic energy of the vehicle is converted to heat, the vehicle is slowed or its speed held constant (e.g. on downhill runs).

The flow of cooling air across the surface of the axle housing may be improved by providing the axle housing 1a, 11b with a cooling jacket 15 spacedly surrounding the arms 1d and 1f to the ends of the chambers 12 with a substantially uniform clearance from the ends of the ribs. The housing or jacket 15 is held in place by spiders 15a and forms a pair of inlets 15b and 15c through which air can be sucked axially (arrows A) into the housing. At the center of the housing, I provide a cylindrical outlet 15d in which a blower 14, operated by a fluid of the electric rotor 14a, is mounted to draw the warm air from the housing.

As shown in FIG. 3, the hydrodynamic brake fluid may be drawn from the chamber 12 as represented diagrammatically with 12a via a valve 12b actually located within the axle housing and delivered to an inner portion of the pumping assembly formed by the rotor 3 and the juxtaposed stator portion 4a. At a location on the periphery of the stator, a hydrodynamic brake fluid is led at 12c out of the pump via a valve 12d into the chamber 12 for heat dissipation. The valve 12b and 12d and means for pressurizing and depressurizing the pumping arrangement to control the hydrodynamic brake effectiveness can be operated by electrical means under the control of the driver or may be automatic and may be constituted as described in the aforementioned copending applications or issued patents. The valve systems may be incorporated in the axle housing as previously noted.

The improvement described and illustrated is believed to admit of many modifications within the ability of persons skilled in the art, all such modifications being considered within the spirit and scope of the invention except as limited by the appended claims.

1. A rear-axle assembly for an automotive vehicle, said assembly comprising: a pair of wheels on opposite sides of said vehicle; a pair of axially aligned shafts coupled with said wheels for driving same and having ends approaching one another substantially midway between said wheels; a nonrotatable axle housing mounted on said vehicle and surrounding said shafts while rotatably supporting same, said axle housing extending the full axial distance between said wheels and having an enlarged central portion surrounding said free ends of said shafts and defining an annular chamber therearound, said housing further reaching outwardly from said chamber to the region of the respective wheels; a hydrodynamic brake received wholly in said axle housing and including a pair of hydrodynamic brake rotors received in said chamber and respectively connected with said ends of said shafts for pumping a hydrodynamic brake fluid upon rotation of at least one of said shafts to generate thermal energy within said axle housing, said axle housing having at least one wall directly in contact with surrounding air and with said brake fluid; and means on said axle housing including fins on said wall for dissipating said thermal energy.

2. The assembly defined in claim 1, further comprising step-up transmission means mounted at each end of said axle housing and including a ring gear rotatably entrained by each wheel, and a pinion gear meshing with each ring gear, connected to the respective shaft, and a wheel housing fixed to the axle housing at each end thereof and receiving the gears of the respective transmission means.

3. The assembly defined in claim 1 wherein said chamber comprises a pair of compartments adapted to receive fluid circulated by the respective rotors, said housing having a pair of housing portions interconnected at the center of said axle housing, said assembly further comprising a stator clamped between said housing portions and cooperating with said rotors for the displacement of hydrodynamic brake fluid.

4. The assembly defined in claim 1 wherein the last-mentioned means includes fins formed on the exterior of said axle housing and a jacket spacedly surrounding said axle housing for inducing the flow of air along said fins.